(12) United States Patent
Kanteti et al.

(10) Patent No.: US 9,280,467 B1
(45) Date of Patent: Mar. 8, 2016

(54) METADATA FLUSHING USING ADDITIVE INCREASE AND MULTIPLICITIVE DECREASE TO DETERMINE A NUMBER OF IO PROCESSES USED

(71) Applicant: EMC Corporation, Hopkinton, MA (US)

(72) Inventors: Kumar Kanteti, South Grafton, MA (US); William Davenport, Burlington, MA (US); Philippe Armangau, Acton, MA (US)

(73) Assignee: EMC Corporation, Hopkinton, MA (US)

(*) Notice: Subject to any disclaimer, the term of this patent is extended or adjusted under 35 U.S.C. 154(b) by 217 days.

(21) Appl. No.: 13/834,360

(22) Filed: Mar. 15, 2013

(51) Int. Cl.
*G06F 12/08* (2006.01)
*G06F 3/06* (2006.01)

(52) U.S. Cl.
CPC .......... *G06F 12/0808* (2013.01); *G06F 3/0659* (2013.01); *G06F 3/0611* (2013.01); *G06F 3/0673* (2013.01)

(58) Field of Classification Search
None
See application file for complete search history.

(56) References Cited

U.S. PATENT DOCUMENTS

| 7,433,898 | B1 | 10/2008 | Georgiev | |
|---|---|---|---|---|
| 7,725,661 | B2 | 5/2010 | Liu et al. | |
| 7,809,868 | B1 | 10/2010 | Mu | |
| 2006/0294301 | A1* | 12/2006 | Zohar et al. | 711/113 |
| 2010/0106820 | A1* | 4/2010 | Gulati et al. | 709/224 |

* cited by examiner

*Primary Examiner* — Charles Rones
*Assistant Examiner* — Hewy Li
(74) *Attorney, Agent, or Firm* — BainwoodHuang

(57) ABSTRACT

A method and a system to dynamically determine how much of the total IO bandwidth may be used for flushing dirty metadata from the cache to the main memory without increasing the host memory access latency time, includes increasing the number of IO processes by adding a number of IO processes at short intervals and measuring host latency. If the host latency is acceptable, then increasing the number of IO processes again by the same number, and repeating until the host latency period reaches a limit. When the limit has been reached, reducing the number of IO processes by a multiplicative factor, and repeating the additive process from the reduced number of IO processes. The number of IO processes used for flushing dirty metadata may resemble a series of saw teeth, rising gradually and declining rapidly in response to the number of host IO processes needed.

16 Claims, 6 Drawing Sheets

METADATA FLUSHING USING ADDITIVE INCREASE AND MULTIPLICITIVE DECREASE TO DETERMINE A NUMBER OF IO PROCESSES USED

BACKGROUND

When a host system (i.e., a user) is writing data to a persistent memory device or storage system, such as a magnetic disk system, the storage system may employ its own file system that controls transfer of IO (i.e., input and output) data between the host system and the storage system. The file system keeps track of various pieces of information about the IO data, which may be known as metadata. Metadata is information about the data, such as inode tables, block metadata (BMD), directories and mappings for finding various parts of the data, slice mapping, special block data, file type, and other forms of information about the data.

When a storage processor (SP) file system transfers data it also locally stores metadata in a cache in the SP. During IO processing, the SP file system writes to a log buffer memory location and marks the buffer as dirty, meaning that the data in the buffer is not the same as the data in the storage system, typically a persistent memory or non-volatile data memory media such as a magnetic hard disk drive (HDD), an electronic flash drive (EFD), or a solid state disk (SSD). That is to say that the data is not synchronized between the persistent memory of the storage system and the log buffer of the SP file system cache memory. To make the metadata consistent the SP file system may perform what may be known as a sync operation at time intervals, for example every 10 to 40 seconds. The sync operation is a period of time when the metadata in the SP file system cache is transferred to the storage media to update the metadata in the storage media, thus making the metadata consistent between the storage media and the SP cache, and synchronizing the data. The sync process may be called flushing the dirty metadata.

Sync operations require that a selected portion of the total IO process bandwidth be dedicated to the IO needed for the sync operation, and thus may reduce the total number of TO processes available for host R/W (read and write) requests. This may increase the host memory latency time for memory operations in high usage situations.

SUMMARY

A problem with performing a sync operation using a small predetermined proportion of the total TO bandwidth, is that the number of TO processes that are needed for host TO requests may vary greatly over short time intervals, and thus a memory buffer used to temporarily store dirty metadata in a SP file system may reach its maximum capacity before the predetermined number of sync TO processes can flush the dirty metadata to the main persistent memory. Such a situation may interfere with the host TO access to the memory system. Selecting too large a proportion of the total TO bandwidth for SP file system metadata sync operations may result in increased host memory request latency times during periods having a high number of host TO requests. What is needed is a method to dynamically determine how much of the total TO bandwidth may be used for flushing metadata from the cache to the main memory without increasing the host memory access latency time.

Disclosed is a system and a method for flushing dirty metadata memory buffers in a SP file system, where determining the number of TO operations to use for SP file system metadata sync operations includes identifying which buffers contain dirty metadata in the SP file system cache memory, and determining whether or not there is capacity to initiate a new TO operation for flushing dirty metadata. Determining the proper balance of metadata flushing TO operations versus normal host system TO operations includes setting a window size value that will limit the number of concurrent TO operations used for flushing dirty metadata buffers in an SP file system to a persistent memory, by storing the window size value in a first memory location, and periodically measuring the TO latency value, which indicates if the host systems are waiting too long for writing or fetching data to or from the persistent memory. The window size value is increased, for example by adding a number of TO operations, if the TO latency value is less than a predetermined acceptable value, and then the increased window size value is stored for the next measurement cycle, which may occur immediately. The window size value is decreased, for example by reducing the value by a multiplicative factor less than one, if the IO latency value is more than or equal to the predetermined acceptable latency value.

After determining a proper current size of the window based upon the latency period, a new IO operation to transfer the dirty metadata to the persistent memory may be initiated if the number of current flushing IO operations is less than the window size value. If the number of current IO operations being used for flushing dirty metadata buffers is more than the window size value, then initiating a new flushing IO operation cannot be initiated, thus delaying transferring the dirty metadata to the persistent memory location.

In this fashion the number of flushing IO operations being used for SP file system metadata sync operations may be gradually increased during time periods when there are relatively few host system IO requests, and thus the dirty SP file system metadata cache memory locations may be more rapidly flushed without interfering with the host IO access delay or overfilling the SP file system cache. When a sudden increase in host IO requests occurs, the system can rapidly reduce the number of flushing IO processes being used by the SP file system metadata cache to flush dirty metadata by application of a multiplier less than one, to avoid slowing system operation.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the disclosed arrangement will be described. It should be understood that the embodiments are provided as examples to illustrate the principles and use of the inventive concepts, and that the material of the disclosure is broader than the specific examples given, and should only be limited by the attached claims.

An improved system and a method for efficiently flushing dirty metadata memory buffers in a file system without increasing host latency includes gradually increasing the number of IO processes used to flush dirty metadata until host system latency increases, and then rapidly reducing the number of IO processes, and repeating at short time intervals. The improved system and method may include adding a fixed number of IO processes to the flush IO window, and reducing the window size rapidly when the host system latency increases by use of a multiplicative factor having a magnitude of less than one.

Figure 1A:
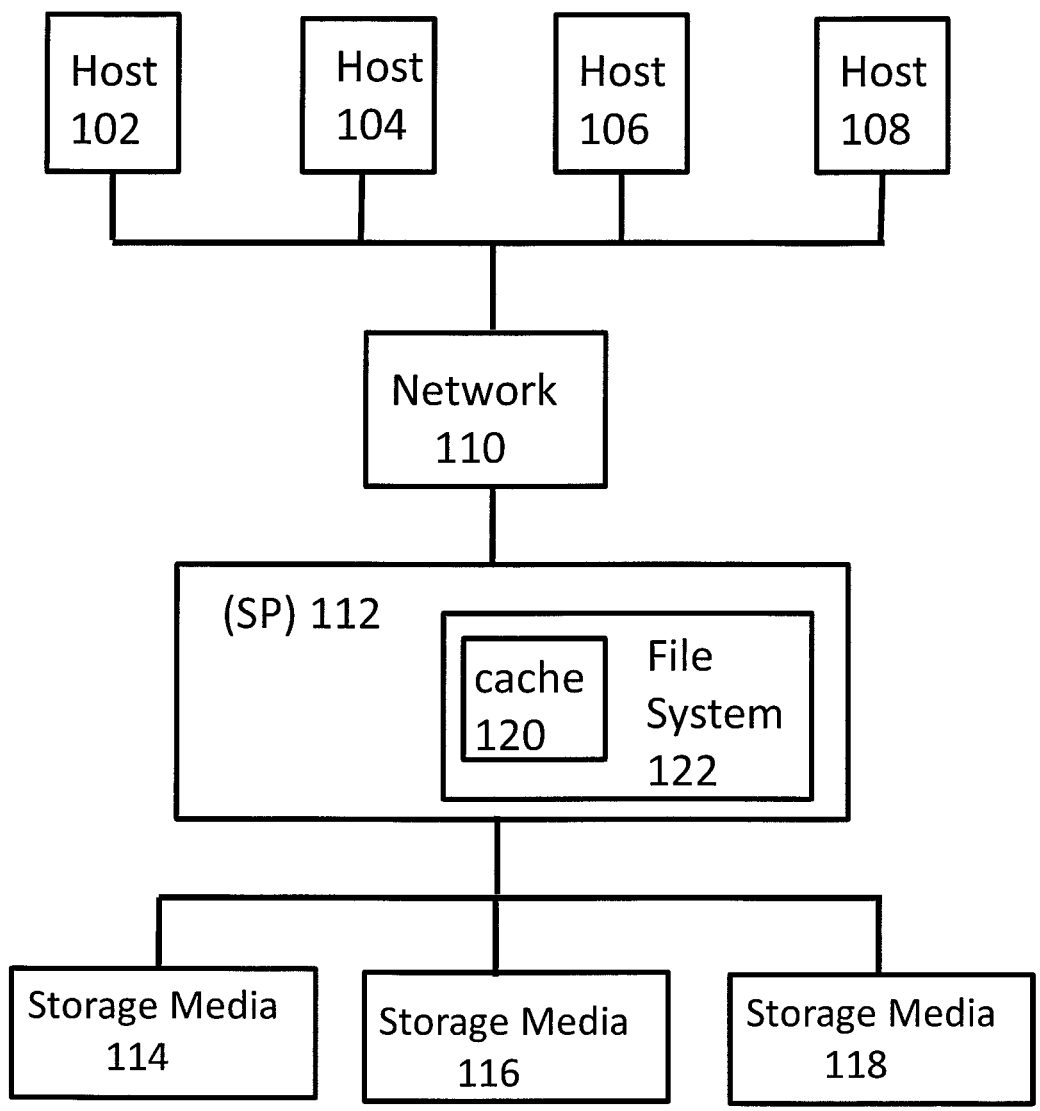
FIG. 1A is a block diagram of an exemplary storage processor.

FIG. 1A is a block diagram showing an exemplary storage processor in an environment showing the use of the present arrangement. Host systems 102, 104, 106 and 108 are users of the memory storage system, and may be at a remote location and communicate read or write requests by communicating over a network 110, or the host systems may be located local to the storage processor 112, and have direct communication lines. Although four host systems are shown in the figure, the inventive concept is not so limited, and there may be a single host system, or any number of host systems, and the host systems may communicate with the storage processor (SP) 112 in any way, including wireless, infrared, hard wire, or internet.

The SP 112 may typically be one of many parallel storage processors, each connected to the host systems, and serving whichever host system has a R/W (read or write) request at a time that the storage processor is not busy. While only one SP 112 is shown in FIG. 1, it is clear that any number of SPs can use the disclosed arrangement separately. Each SP may have multiple file systems 122, and each file system may have any number of metadata caches 120, which may be used for different types of metadata or other data.

The SP 112 may be connected to a large memory such as a database, and controls the host system access to the large memory, which may be a single magnetic hard disk drive (HDD), or a cluster of HDD systems such as is found in RAID arrays, or it may be any other arrangement of memory devices, such as the three parallel storage media systems 114, 116 and 118, as shown in FIG. 1 as an exemplary embodiment. SP 112 may have many internal subdivisions for various operations, including a cache memory 120, for use by a file system 122 included in the SP 112. The SP file system 122 may typically be a part of a data storage system having many file systems in each one of a large number of SPs, serving a large number of users, or host systems, in accessing portions of a large database, such as storage media 114. The database may be one large memory device, or an array of memory devices that may be distributed widely geographically for security and back up purposes.

When a file system 122 accesses metadata residing on storage media 114 to be used in an operation, it may be useful to make a copy of the metadata in a more rapidly accessible location, such as cache memory 120 in the SP 112. Cache memories in a SP may be accessed more quickly than magnetic hard disk drives connected to the SP. The cache 120 may reduce the amount of time the file system 122 spends accessing metadata that is frequently used, as cache is typically made of fast semiconductor memory such as DRAM rather than relatively slow magnetic media. The operation of the file system 122 results in changes to the metadata in the cache memory, for example by updating a table indicating location of host data on storage media 114. Thus, for some time period the cache 120 and the storage media 114 may have two different values stored for one metadata variable. This lack of synchronization is addressed by the file system 122 updating the main memory location in storage media 114 with the new value stored in the cache 120. This updating is referred to as flushing the dirty (i.e., changed/updated) metadata from the SP cache 120 to the persistent memory (i.e., storage media 114), and it occurs during what is referred to as a sync operation. The sync operation synchronizes the updated SP cache information with the data location in the storage media 114.

There may be numerous cache memories in the SP 112, each cache used for a different type of metadata. Generally, metadata includes different types of information about the main data stored in the file system, such types including directories, maps, memory slices, and inode tables for example. Metadata is temporarily stored in the SP 112 in a cache memory such as 120, and is marked as dirty when the data is changed. Thus the SP metadata in cache 120 need to be flushed to the storage media 114 periodically, typically during a metadata sync operation. Sync operations occur periodically, for example from every ten to forty seconds, depending on dirty metadata generation rates.

An illustrative method flushes the SP metadata cache 120 by performing a sync process periodically to transfer dirty metadata in memory buffers in cache 120 to a persistent memory location such as storage media 114. The flushing for a given file system 122 uses TO operations, which may be in competition with TO operations used by host systems 102 as well as in competition with TO used by other file systems 12 in their flushing operations. Since SP metadata sync IO operations may occur concurrently with the normal host system IO operations, there needs to be a balance between the number of IO operations used to flush dirty metadata versus the number of host system IO operations, since the total number of possible concurrent IO operations in any system is limited, for example to about 512 concurrent IOs. Also, there needs to be a balance among the IO operations used for flushing dirty metadata among multiple file systems 122.

Figure 1B:
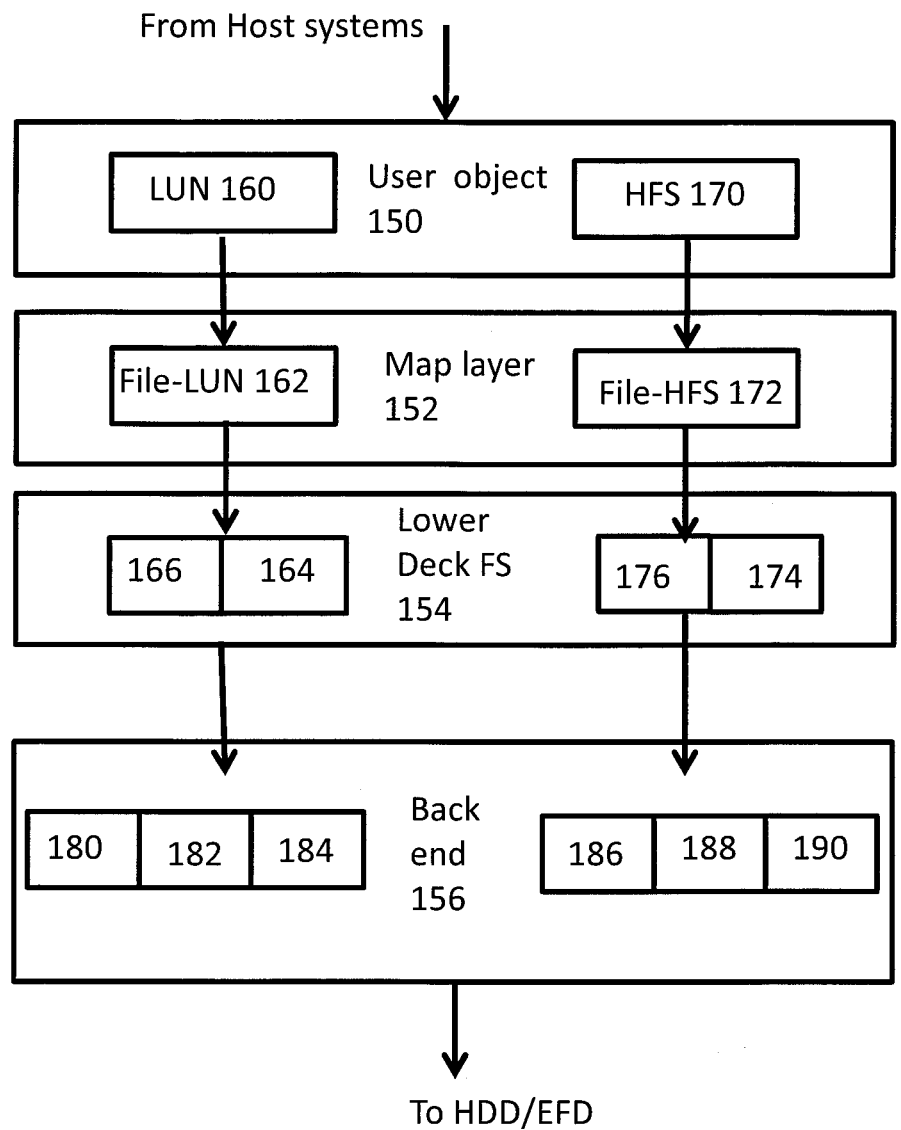
FIG. 1B is a logical diagram of an exemplary storage processor.

FIG. 1B is a logical diagram of a portion of the exemplary storage processor shown in FIG. 1. A storage processor, such as SP112 of FIG. 1A, may be a computer that manages the host system 102 communication with a storage media 114 of FIG. 1A, and all of the illustrative activities of this disclosure occur in the SP, which has a front end to communicate with the host systems, and a back end to communicate with the memory storage media.

The front end of an SP includes, among other items, a user object layer 150, a mapping layer 152 and a file system shown as a lower deck file system 154. The file system 154 is a component of the storage system and logically distinct from a file system used by a host 102, as explained more fully below. The present disclosure is directed to operation of the lower deck file system 154. While this illustrative embodiment is shown as a lower deck file system, the disclosure is not so limited, and may be used with any file system.

Generally, the user object layer 150 includes a representation of a storage logical unit (LUN) 160, representing blocks of data where each block is 4K bytes in size for example. The user object layer 150 may also include a representation of a host file system (HFS) 170, so the user object layer 150 can communicate in either LUNs or in host file system format. While this illustrative embodiment is described using LUNs, the disclosure is not so limited, and may include data in the form of files via CIFS, NFS or other protocols, or other data objects.

The mapping layer 152 includes a LUN-to-file mapping 162 and an HFS-to-file mapping 172. The LUN-to-file mapping 162 maps the LUN 160 to a first file system 164, and the HFS-to-file mapping 172 maps the HFS 170 to a second file system 174. Through the LUN-to-file mapping, any set of blocks identified in the LUN 160 by a host IO request is mapped to a corresponding portion of a file within the first file system 164. Similarly, through the HFS-to-file mapping, any file or directory of the HFS 170 is mapped to a corresponding portion of a file within the second file system 174.

In this example, a first lower-deck file system 164 includes the first file and the second file system 174 includes the second file. Each of the file systems may include an inode table, e.g., 166 and 176, respectively. The inode tables provide information, in the form of inodes, about files in respective lower-deck file systems. For example, the inode table 166 of the first lower-deck file system includes file specific information about the first file. This file specific information is one form of metadata. Similarly, the inode table 176 of the second lower-deck file system includes an inode which provides file-specific information about the second file. The information stored in each inode includes location information (e.g., block locations) where the respective file is stored, and may thus be accessed as metadata to identify the location of the files.

Generally, each of the lower-deck file systems may include any number of files, each with its own entry in the respective inode table, or any number of other forms of metadata. As an example, each lower-deck file system may also store point-in-time copies of storage objects (LUNs or HFSs) in what are referred to as "snaps" of those objects. For instance, the first lower-deck file system may store a first file along with a different file for every snap of the LUN 160.

As shown, a set of memory slices 180, 182, and 184 is allocated from a storage pool for storing the first file in file system 164 on a magnetic hard disk drive HDD or electronic flash drive EFD of the backend 156. Similarly, a set of memory slices 186, 188, and 190 is allocated from the storage pool for storing the second file in file system 174. The data that make up the LUN 160 are thus stored in the slices 180, 182, and 184, whereas the data that make up the HFS 312 are stored in the slices 186, 188, and 190. Slices may be allocated to the file systems 164 and 174 in an on-demand manner, e.g., as the first and second files require additional storage. Slices can also de-allocated from the file systems when all the currently allocated slices are no longer required.

In some examples, each of the lower-deck file systems 164 and 174 is associated with a respective memory volume, such as a sparse LUN. Sparse LUNs may be used to provide an additional layer of mapping between the lower-deck file systems and the memory pool and allow the lower-deck file systems to operate as file systems normally do, by accessing underlying volumes. Additional details about sparse LUNs and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 2:
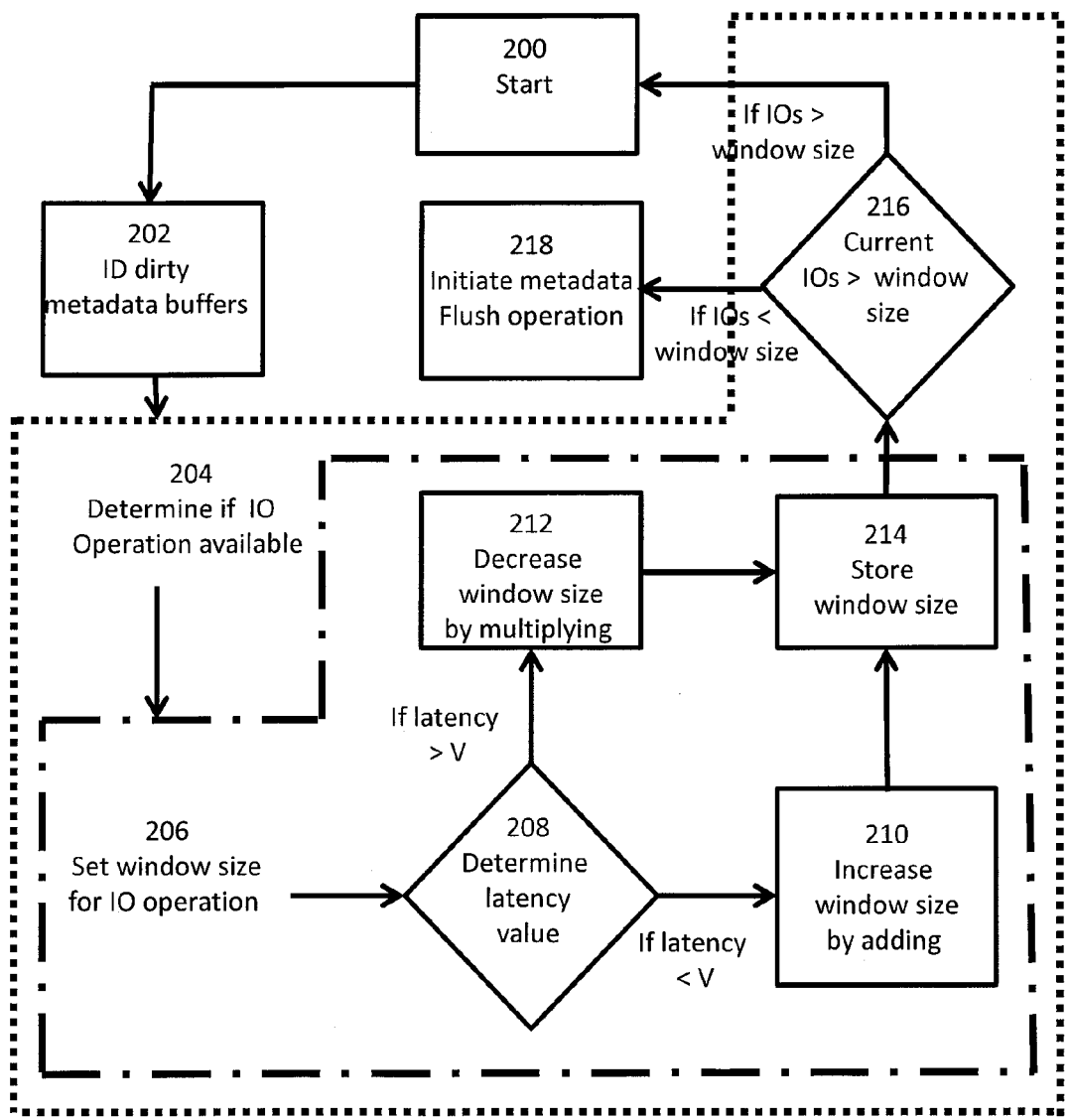
FIG. 2 is a flowchart showing a method using the present arrangement.

FIG. 2 is a flowchart showing a method using the present arrangement. The method starts at step 200, and then first determines, at step 202, identifying which buffers contain dirty metadata in the SP cache memory 120. The method generally uses a number of concurrent IO operations for sync operations, and thus determines at 204 (the steps surrounded by the dotted line) whether or not there is an ability to initiate a new concurrent IO operation for flushing dirty metadata from the SP cache 120. The method determines the proper balance between flushing IO operations and normal host system IO operations, as well as among flushing IO operations of different file systems 122, at 206 (the steps enclosed in the dot/dash line) by determining what is known as a congestion window size. The window size value determined at 206 limits the maximum number of concurrent IO operations that may be used for flushing dirty metadata buffers in the SP cache 120 at a given time to a persistent memory, such as a magnetic disk, a solid state disk made of Flash memory chips, magnetic tape, or combinations of non-volatile memory, such as storage media 114.

The method includes storing the window size value in a first memory location, and periodically measuring an IO latency value at step 208, indicating an amount of time required to write a dirty metadata buffer to the storage media 114 etc. The IO latency may be directly measured, or may be calculated, or estimated. The method stores the IO latency value in a memory location, and compares it to a predetermined latency value V. The method increases the window size value at step 210 if the IO latency value is less than a predetermined latency value V, and then stores the increased window size value in the memory for use in the next measurement cycle. The method decreases the window size value at step 212 if the IO latency value is more than or equal to the predetermined latency value V, and stores the decreased window size value in the memory location at step 214. The increase and decrease are done using specific types of values as described below.

The value V may be based upon a quality of service (QOS), which may be set by a system administrator of the storage system, or by each individual host system, or by other means. The QOS may be evaluated by a number of IO operations performed per second, or the number of LUNs per second, or the number of files per second, or other measures. The value V may also be a calculated value determined by an average value determined over a selected time period, such as an hour or a day, so that the host may use the value V to plan their workload.

After determining a proper current size of the window based upon the latency period, the method includes determining whether or not to utilize one more concurrent IO operation at step 216, initiating a new IO operation at step 218 to transfer the dirty metadata to the persistent memory if the number of current IO operations is less than the stored window size value, and not initiating a new IO operation (i.e., delay transferring the dirty metadata to the persistent memory location) if the number of current IO operations being used for flushing dirty metadata buffers is equal to or more than the window size value, and return to start at step 200.

In this fashion the number of concurrent IO operations used by a SP file system to flush dirty metadata can be adjusted to complement the amount of IO operations left unused by the host systems. That is the method gradually increases the number of IO operations used for SP file system metadata flushing whenever the host systems are not using all the available back end IO bandwidth, as determined by the magnitude of the latency time.

In the increasing and decreasing of steps 210 and 212, an additive-increase and multiplicative-decrease (AIMD) method is used. The window size is increased by adding a predetermined fixed value to the window size value. The fixed value may be an arbitrary small number, such as one for example, or it may be more systematically related such as fraction of the window size limit. This provides small regular additive steps. The window size is decreased more rapidly by multiplying the current window size value by a value less than one, typically a value between 0.25 and 0.75.

With such an arrangement of small additive increases rapid multiplicative decreases, the number of concurrent IO operations used by SP file system dirty metadata flushing operations rapidly converges to an optimum value even when the method is used independently by many different SP file systems 122 operating in parallel with a group of host systems. Thus, the number of concurrent IO operations for flushing dirty metadata in the SP file system caches will be dynamically adjusted up to the highest number that can be used without adversely affecting the IO latency, even in rapidly changing IO operation demand environments.

Figure 3:
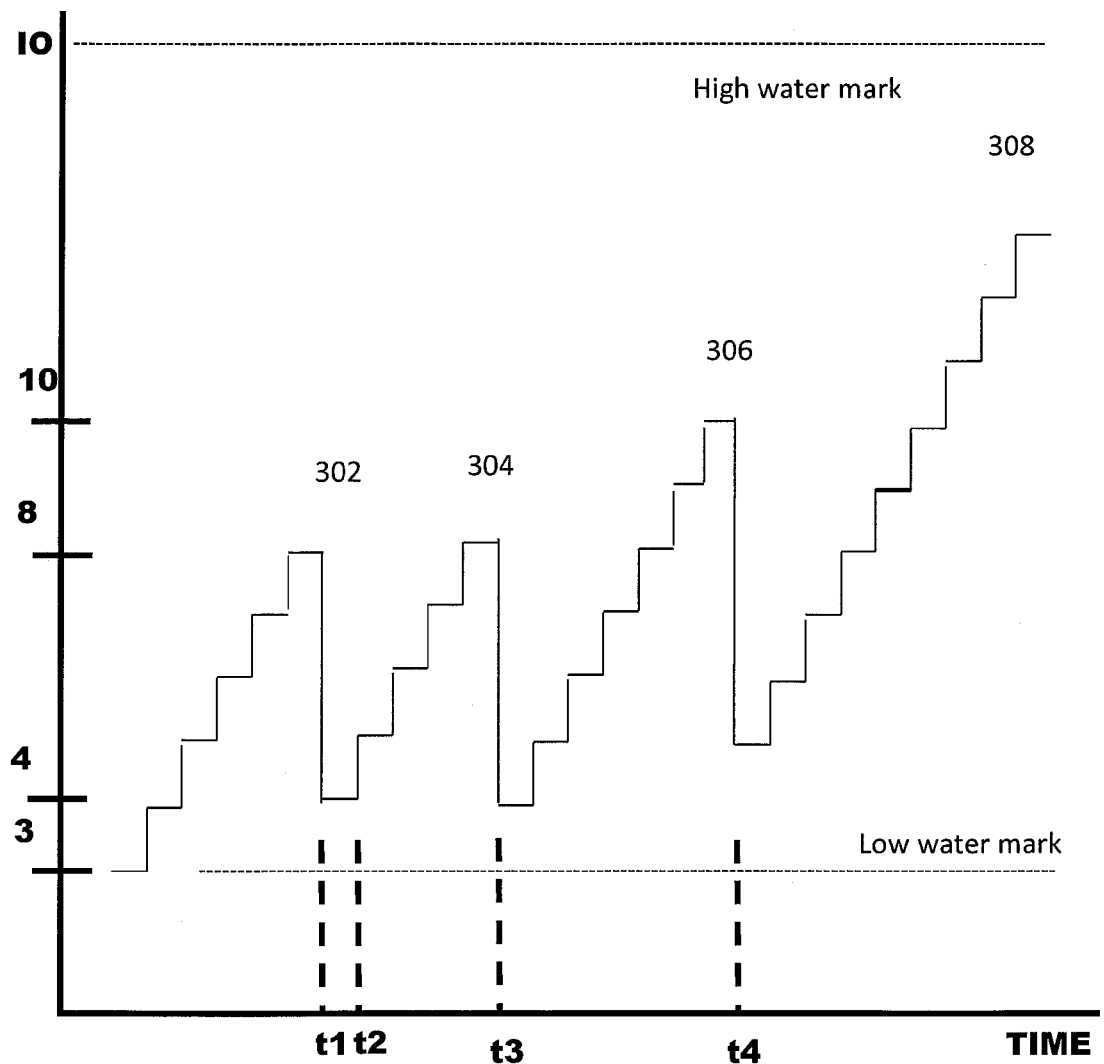
FIG. 3 is a graph showing the variation in number of IO operations.

FIG. 3 is a graph showing the variation in number of IO operations as a function of the present method. The vertical axis shows the number of concurrent IO processes used at a specific time for metadata flushing operations. In this illustrative example the low water mark indicating the minimum of concurrent IO processes for metadata flushing is set at 3, and high water mark is set at some level above 10. The high water mark can be set depending upon system requirements and may be at any value or percentage of the total backend bandwidth. The time interval between testing the latency and resetting the window size for the maximum number of metadata flushing operations to be used at this particular time period, may be a constant value as shown by the illustrative time gap between the horizontal axis marks t1 and t2. The time between resetting the window size is not limited to any particular value and may be altered at any time depending upon system parameters, such as reduced load demand on weekends.

The method increases the flush IO operation window size from the low water mark, indicated in this illustrative example as being the number 3, and increases the window size by an adjustable increment, which in the present example is selected to be the number one. Each time increment t2−t1, the method measures or determines the latency and increases the window size by one additional concurrent IO process, until the repeatedly measured latency period reaches the latency value V as discussed above. The specific latency value triggering the reduction generally changes depending upon system conditions. In the illustrated example, this first occurs at the point 302 when the number of concurrent IO operations is equal to 8, at the time t1, and the method then reduces the window size rapidly, to 4, to avoid congesting the backend.

In this illustrative embodiment the window size has been reduced from 8 to 4 concurrent IO processes at time t1, by multiplying the window size by 0.50. The disclosure is not limited to any particular multiplicative reduction value as long as it is less than 1 and greater than zero. The choice of the multiplicative value depends upon system parameters such as how fast the host IO process usage typically changes with relation to the measurement time increment of t2 minus t1, but the value may typically be between 0.25 and 0.75. The additive increase value is also adjustable depending upon system parameters and may be determined by a mathematical relation such as 10 percent of the maximum window size, with fractional values either truncated or rounded to the nearest integer value. Generally, the use of this AIMD method produces a saw tooth-like progression in the number of concurrent IO operations available for SP metadata flushing IO processes, with a low slope upward ramp, and a sudden deep vertical drop when IO latency reaches the value V, as shown in FIG. 3.

The number of concurrent IO operations that may be used for SP file system metadata flushing operations may depend upon the amount of unused host system IO operation bandwidth, as noted above and as determined by changes in IO request latency. FIG. 3 illustrates the situation where IO latency reaches the value V at time t1 when the window of allowable metadata flushing IO operations has been increased from 3 to 8 at step 302. In this illustrative example the 0.50 multiplicative reduction value then reduces the number of IO operations for metadata flushing to 4, and at time t2 the latency time is determined to be less than the limit value V and the additive increase begins again.

At 304 the number of concurrent IO operations for metadata flushing has reached 8 again and the IO latency at 304 again reaches the limit V, and the 0.50 multiplicative reduction value reduces the window size again to 4. The illustrative example of FIG. 3 now shows the situation when the system IO operation demand and IO latency begins to be reduced such that by 306 the step wise additive increase has reached a window of 10 concurrent IO operations before the measured latency reaches the value V at time t4, and the illustrative 0.50 reduction factor results in 5 maximum allowed SP file system concurrent sync IO operations.

The illustrative example of FIG. 3 continues to show a further reduction in the system IO operation demand and IO latency and thus the additive stepwise increase in window size has reached 13 at 308. If at this point the system IO demand were to increase so as to increase IO latency, then subsequent ramps would reach lower maximum step values. With such an arrangement the window for allowable number of SP file system metadata flushing IO operations may be kept as high as the total bandwidth and the system IO operation demand will allow, while keeping the system IO operation latency at acceptable levels.

When the file system is first started up upon booting the storage system, the disclosed method includes setting the window size to a minimum number of metadata flushing IO processes, known as the low water mark and shown as 3 in the illustrative example of FIG. 3. This setting of the window to the low water mark may also occur when the calculated window value for any reason is less than the low water mark, such as may occur for example under high conditions of high IO latency that will trigger a decrease even for small window sizes. For example, if a decrease is triggered when the window size is 5, then the multiplicative decrease would reduce the window size to 2.5, which might be rounded down to 2 unless a low water mark of 3 prevents the window size from being set below 3.

In situations where there is very low or very high temporary host system IO operation demand, the disclosed arrangement may adjust the acceptable latency value, and thus the numbers of IO operations to use in flushing dirty metadata from SP file systems, systems, when the number of active concurrent host system IO operations is less than a predetermined IO value.

Figure 4:
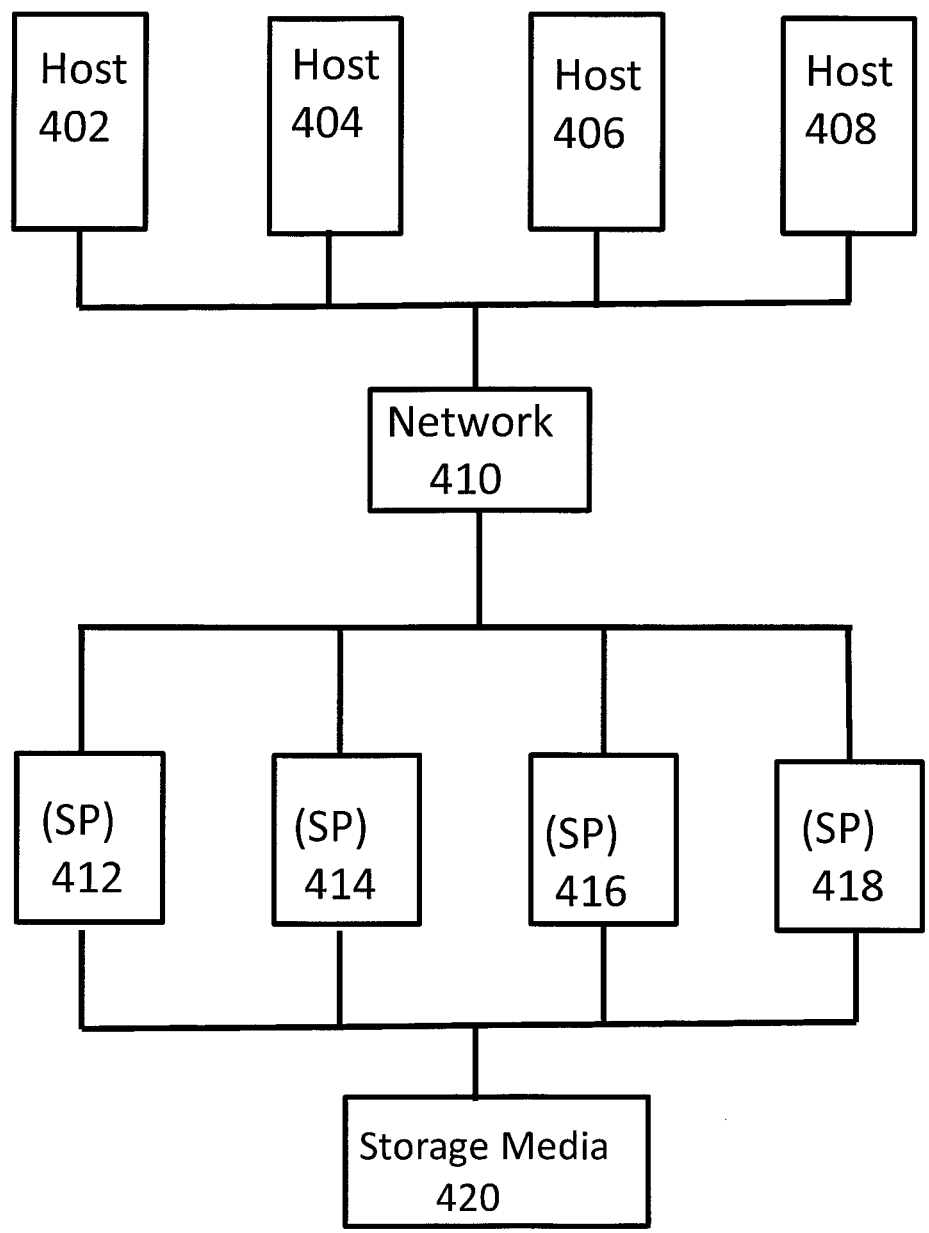
FIG. 4 is a block diagram of multiple host, SP and file systems.

The disclosed arrangement may include multiple storage processors and multiple file systems, similar to the single file system 122 of SP 112 shown in FIG. 1, each operating in parallel and accessing the same persistent memory resources. FIG. 4 is a block diagram of multiple host, SP and file systems. FIG. 4 illustratively shows four host systems 402, 404, 406 and 408, but the disclosure is not so limited and any number of host systems may be included. The host systems are communicatively connected to the storage processors by the network 410, but the disclosure is not so limited and any communication method may be used. The illustrative embodiment includes four SP units 412, 414, 416 and 418, but the disclosure is not so limited and there may be any number of SPs, or the SPs may be hierarchically arranged in clusters, or may be remote from each other for operational backup, disaster recovery and reliability reasons.

Each of the SP units may have a number of separate file systems, such as the single file system 122, and a number of separate cache memories, such as the single cache 120 shown in FIG. 1. Each of file systems may operate independent of the other file systems and independent of the other SP units and may serve any of the host systems IO operation requests.

In this illustrative embodiment all the SPs are connected to a single database, storage media 420. The storage media 420 may be a single magnetic disk, or an array of magnetic disks, or any other persistent mass memory storage device. Each file system in each SP may independently reach a metadata flush trigger, and begin to flush dirty metadata to the storage media 420, and may determine the number of concurrent flushing IO operations to use by setting the window size value for each individual one of the file systems separately, with each file system responsive to the IO latency in that individual file system.

The disclosed arrangement also includes selecting the window size used for flushing dirty metadata buffers by calculating a portion of a total number of IO operations used by all of the host systems together for communicating with the persistent memory storage media 420, to maintain a balance between the overall host IO operation demand and the sync operations concurrent IO usage.

Figure 5:
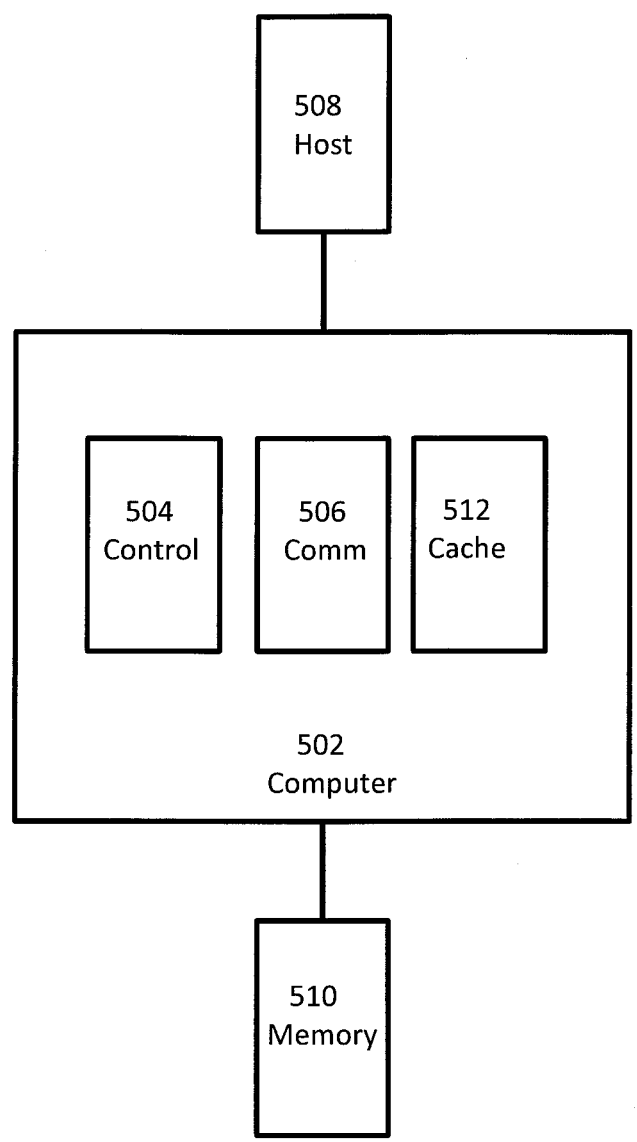
FIG. 5 is a block diagram of a system used in the present arrangement.

FIG. 5 is a block diagram of a system used in the present arrangement. An illustrative system to perform the method described above for flushing dirty metadata in memory buffers in a SP file system cache memory to a large memory bank may include a storage processor, such as a general purpose computer 502. The storage processor 502 may include controller circuitry 504 and communications circuitry 506, and be disposed between at least one host system 508, and at least one persistent memory system 510.

The controller 504 is constructed and arranged to periodically perform a sync process to transfer dirty metadata buffers in a cache memory 512 to a persistent memory location 510 using IO operations. The controller 504 identifies dirty metadata buffers in the cache memory 512 and determines if an unused IO operation for flushing dirty metadata is available. To do this the controller 504 sets a window size of maximum concurrent IO operations allowed for flushing dirty metadata buffers from SP cache memory 512 to persistent memory 510. The window size value is stored in a controller 504 memory location. The IO latency is periodically measured and stored in controller 504. The window size value is increased if the IO latency is less than a predetermined value, and decreased if the IO latency value is more than or equal to a predetermined latency value. High IO latency generally corresponds to greater concurrent usage of the backend storage. If the IO latency is not too high, the controller 504 may initiate a new IO operation to transfer dirty metadata to the persistent memory 510, if the current number of concurrent IO metadata flushing operations does not exceed the window size value.

The controller 504 increases the window size value by addition to the value of the window size, for example by adding one new concurrent IO operation, or by using a minimum metadata IO window size value divided by a number from 2 to 3, to create small steps. The controller 504 decreases the window size by multiplying it by a value between 0.25 and 0.75, to provide a saw tooth slow rise and a rapid drop when the IO latency increases, as shown in FIG. 3, in order to rapidly respond to variations in host system IO demand.

The controller 504 can set the window size value based upon the operational state of the system. The window size stored in the controller 504 memory location may be used as the base to set the new window size when the file system state is in normal operation. A first predetermined value may be used when the value stored in the first memory location is not between a known high water mark and the low water mark, or the file system has been booted.

The disclosed system is an auto detect for back end, or memory interface, bandwidth control to avoid data congestion in the backend of the storage system. The system operates by continuously checking latency times of IO operations. When the latency starts to rise it indicates that the number of IO operations used for flushing metadata may be restricting the number of IO operations usable by the host systems or other file systems. The maximum allowable number of simultaneous, or concurrent, IO operations that may be used for flushing dirty metadata entries in a cache memory without increasing host system IO operation latency, is known as a window. The window defines a minimum number of concurrent IO operations that should always be maintained to avoid overflowing the cache with update data, and it has a maximum number of concurrent IO operations that should be allowed for metadata flushing. These are known respectively as the low water mark and the high water mark.

The method used to keep the window size as large as possible without hurting the latency involves adding IO operations in small steps, until the latency starts to be too long, and then rapidly reducing the window size by multiplicative reduction. This may be known as additive increase/multiplicative decrease, or AIMD, and may result in rapid response and convergence to an optimum value.

While various embodiments of the present disclosure have been particularly shown and described, it will be understood by those skilled in the art that changes in form and detail may be made without departing from the spirit and scope of the present disclosure as defined by the appended claims.

What is claimed is:

1. A method for flushing dirty metadata memory buffers in a file system, comprising:
   performing a sync process periodically to transfer dirty metadata in memory buffers in a cache memory to a persistent memory location using IO operations, the sync process including:
      identifying dirty metadata buffers in the cache memory;
      determining ability to initiate a new IO operation for flushing dirty metadata in the cache memory, by:
         setting a window size value limiting a number of concurrent IO operations for flushing dirty metadata buffers in a cache memory of a controller to a persistent memory;
         storing the window size value in a first controller memory location;
         periodically measuring an IO latency value during a time period the controller is flushing dirty metadata buffers;
         storing the IO latency value in a second controller memory location;
         increasing the window size value if the IO latency value stored in the second controller memory location is less than a predetermined latency value, and storing the increased window size value in the first controller memory location; and
         decreasing the window size value if the IO latency value is more than or equal to, the predetermined latency value, and storing the decreased window size value in the first controller memory location; and
   initiating the new IO operation to transfer the dirty metadata to the persistent memory location if a number of current IO operations being used for flushing dirty metadata memory buffers is less than the window size value limiting the number of concurrent IO operations; and
   refraining from initiating the new IO operation to thereby delay transferring the dirty metadata to the persistent memory location if the number of current IO operations being used for flushing dirty metadata buffers is more than the window size value limiting the number of concurrent IO operations, wherein increasing the window size value further includes decreasing the predetermined latency value responsive to a measured number of active concurrent IO operations being less than a predetermined IO value.

2. The method of claim 1, wherein increasing the window size value comprises adding a predetermined additive increase value to the window size value.

3. The method of claim 2, further including selecting the predetermined additive increase value to be a predetermined minimum window size value divided by a number in a range from 2 to 3.

4. The method of claim 1, wherein decreasing the window size value comprises multiplying the window size value by a positive multiplicative decrease value less than 1.

5. The method of claim 4, further including selecting the multiplicative decrease value to be in a range from 0.25 to 0.75.

6. The method of claim 1, wherein selecting the initial value of the window size value further includes a predetermined low water mark minimum number of IO operations needed for flushing dirty metadata.

7. The method of claim 1, wherein setting the window size value comprises:
determining a file system state;
setting the window size value to the value stored in the first controller memory location when determining that the file system state is normal operation, and if the value stored in the first controller memory location is between a predetermined high water mark and a predetermined low water mark;
setting the window size value to a first predetermined value when determining that the value stored in the first controller memory location is not between the predetermined high water mark and the predetermined low water mark, or when determining that the file system has been booted.

8. The method of claim 1, wherein flushing dirty metadata memory buffers in a file system further includes a plurality of file systems each accessing a same memory system, wherein at least setting the window size value for each individual one of the plurality of file systems is determined separately, responsive to a measured IO latency at that individual file system.

9. The method of claim 1, wherein setting the window size value used for flushing dirty metadata buffers comprises calculating a portion of a total number of IO operations used by at least one host system for communications with the persistent memory.

10. A system for flushing dirty metadata memory buffers in a file system, comprising:
controller circuitry including communications circuitry enabling electrical signals to flow between at least one host system to at least one memory system via the controller circuitry, the controller circuitry constructed and arranged to:
perform a sync process periodically to transfer dirty metadata buffers in a cache memory to a persistent memory location using IO operations to;
identify dirty metadata buffers in the cache memory;
determine availability of an unused IO operation for flushing dirty metadata in the cache memory, the system configured to:
set a window size value limiting a number of concurrent IO operations for flushing dirty metadata buffers in a cache memory to a persistent memory and store the window size value in a first controller circuitry memory location;
measure an IO latency value at periodical intervals during a time period the controller circuitry is flushing dirty metadata and store the IO latency value in a second controller circuitry memory location;
increase the window size value if the IO latency value stored in the second memory controller circuitry location is less than a predetermined latency value, and store the increased window size value in the first controller circuitry memory location; and
decrease the window size value if the IO latency value stored in the second memory controller circuitry location is more than or equal to, the predetermined latency value, and store the decreased window size value in the first controller circuitry memory location; and
initiate a new IO operation to transfer the dirty metadata to the persistent memory location if a number of concurrent IO operations being used is less than the window size value, and not initiate a new IO operation if the number of concurrent IO operations exceeds the window size value,
wherein the controller circuitry increases the window size value and decreases the predetermined latency value responsive to a measured number of active concurrent IO operations being less than a predetermined IO value.

11. The system for flushing dirty metadata memory buffers of claim 10, wherein the controller circuitry increases the window size value by addition of a predetermined additive increase to the value of the window size value, the predetermined additive increase value comprising a predetermined minimum window size value divided by a number in a range from 2 to 3.

12. The system for flushing dirty metadata memory buffers of claim 10, wherein the controller circuitry decreases the window size value by multiplying the window size value by a predetermined positive multiplicative decrease value that is less than 1.

13. The system for flushing dirty metadata memory buffers of claim 10, wherein the controller circuitry selects the initial value of the window size value to equal further a predetermined low water mark minimum number of IO operations.

14. The system for flushing dirty metadata memory buffers of claim 10, wherein the controller circuitry sets the window size value based upon a file system state;
the controller circuitry sets the window size value to the value stored in the first memory location when the file system state is in normal operation, and when the value stored in the first memory location is between a predetermined high water mark and a predetermined low water mark;
the controller circuitry sets the window size value to a first predetermined value when the value stored in the first memory location is not between the predetermined high water mark and the predetermined low water mark, or the file system has been booted.

15. The system for flushing dirty metadata memory buffers of claim 10, wherein flushing dirty metadata memory buffers in a file system further includes a plurality of file systems each accessing a same memory system and including a separate controller circuitry for each of the plurality of file systems, and an overall controller circuit.

16. The system for flushing dirty metadata memory buffers of claim 10, wherein the window size value used for flushing dirty metadata buffers comprises a controller circuitry selected portion of a total number of IO operations used for at least one host system for communications with the persistent memory.

\* \* \* \* \*